(12) United States Patent
Tanabe et al.

(10) Patent No.: US 8,305,866 B2
(45) Date of Patent: Nov. 6, 2012

(54) PICKUP APPARATUS, OPTICAL RECORDING AND REPRODUCTION APPARATUS, AND RECORDING AND REPRODUCTION METHOD

(75) Inventors: Norihiro Tanabe, Kanagawa (JP); Kimihiro Saito, Kanagawa (JP); Takahiro Miura, Kanagawa (JP); Yojiro Sumi, Kanagawa (JP); Noriaki Nishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/951,967

(22) Filed: Nov. 22, 2010

(65) Prior Publication Data

US 2011/0134742 A1    Jun. 9, 2011

(30) Foreign Application Priority Data

Dec. 4, 2009   (JP) ................................ 2009-276619

(51) Int. Cl.
  *G11B 7/00*   (2006.01)
(52) U.S. Cl. ................. 369/112.23; 369/112.02; 369/94
(58) Field of Classification Search .............. 369/44.32, 369/44.23, 112.02, 112.23, 112.24, 44.37, 369/103, 94, 53.19, 112.01, 112.05
  See application file for complete search history.

(56) References Cited

U.S. PATENT DOCUMENTS

| | | | | |
|---|---|---|---|---|
| 7,012,875 B2 * | 3/2006 | Shimano et al. | ......... | 369/112.02 |
| 7,038,995 B2 * | 5/2006 | Kitamura et al. | ........ | 369/112.24 |
| 2002/0105890 A1 * | 8/2002 | Ogasawara | .............. | 369/112.02 |
| 2003/0053393 A1 * | 3/2003 | Shimano et al. | ......... | 369/112.02 |
| 2006/0013109 A1 * | 1/2006 | Fujiwara et al. | ......... | 369/112.01 |
| 2006/0067196 A1 * | 3/2006 | Tanimoto et al. | ........ | 369/112.01 |
| 2007/0109948 A1 * | 5/2007 | Tanaka et al. | ............. | 369/112.23 |
| 2007/0279480 A1 * | 12/2007 | Asano | ............................ | 347/233 |
| 2008/0095017 A1 * | 4/2008 | Kawamura et al. | ...... | 369/112.24 |
| 2008/0137493 A1 * | 6/2008 | Shinichi | ...................... | 369/44.23 |
| 2008/0212418 A1 * | 9/2008 | Nagata et al. | ............. | 369/112.23 |
| 2008/0239922 A1 * | 10/2008 | Fujita et al. | ................... | 369/103 |
| 2008/0253267 A1 * | 10/2008 | Nakai | ............................ | 369/118 |
| 2009/0274020 A1 * | 11/2009 | Katayama | ................ | 369/112.02 |
| 2010/0074067 A1 * | 3/2010 | Komma et al. | ............ | 369/44.32 |
| 2010/0103803 A1 * | 4/2010 | Yamasaki et al. | ........ | 369/112.24 |

OTHER PUBLICATIONS

Kasami, Y. et al., "Large Capacity and High-Data-Rate Phase-Change Disks", Jpn. J. Appl. Phys., vol. 39 (2000), pp. 756-761, Part 1, No. 2B, Feb. 2000.

Ichimura, I. et al., "Proposal for Multi-Layer Blu-ray Disc Structure", Technical Digest of ISOM '04, Oct. 11-15, 2005, Jeju Korea, pp. 52-53.

Kobayashi, S., et al., "Introduction to volumetric optical storage technology "Micro-reflector", an ultra-multilayer optical disk", Technical Digest of International Symposium on Optical Memory, 2009, Th-I-01, Oct. 8, 2009, Nagasaki Brick Hall.

* cited by examiner

*Primary Examiner* — Thang Tran
(74) *Attorney, Agent, or Firm* — Wolf, Greenfield & Sacks, P.C.

(57) ABSTRACT

A pickup apparatus includes a light source; a light separator; an object lens that concentrates the light which penetrated the light separator on the optical recording medium; a movable lens; and a light sensing element that receives the reflected light from the optical recording medium separated by the light separator, wherein a coma aberration generated by the transverse shift of the object lens is corrected by a coma aberration which is generated by the deviation of a spherical aberration generated in an optical path from the light source to the object lens and a spherical aberration generated in an optical path from the object lens to a light concentration position on the optical recording medium which are due to the transverse shift.

6 Claims, 13 Drawing Sheets

100

200

PICKUP APPARATUS, OPTICAL RECORDING AND REPRODUCTION APPARATUS, AND RECORDING AND REPRODUCTION METHOD

BACKGROUND OF THE INVENTION

1. Field of the Invention

The present invention relates to a pickup apparatus, a recording and reproduction apparatus, and a recording and reproduction method. In particular, the present invention relates to a pickup apparatus, a recording and reproduction apparatus and a recording and reproduction method suitable for the recording and the reading of information relative to an optical recording medium such as an optical disc.

2. Description of the Related Art

The recording or the reading of information on an optical recording medium such as an optical disc is commonly performed by irradiating the optical recording medium with light from a light source to form or to read a minute change in reflectance on one side of the optical disc.

However, recently, there has been further progress toward an increase in the amount of content able to be stored, and a higher level of precision and complexity, whereby storage of a large amount of content on such a recording medium has been promoted.

For this reason, there is a necessity to reduce a spot diameter of an illumination light used in the recording and the reproduction of information. Furthermore, it is known that the size of the optical spot on the disc is approximately given by $\lambda/NA$ ($\lambda$: the wavelength of the illumination light, NA: numerical aperture) and the resolution is also proportional thereto.

For example, in Y. Kasami, Y. Kuroda, K. Seo, O. Kawakubo, S. Takagawa, M. Ono, and M. Yamada, Jpn. J. Appl. Phys., 39, 756 (2000), it is disclosed that a Blu-ray Disc (trade mark) corresponding to about 25 GB is realized by a disc having a diameter of 12 cm, using a blue violet semiconductor laser having the wavelength of 405 nm as a light source, and an object lens having a numerical aperture of 0.85.

In addition to the miniaturization of the pit in a plane direction of the optical disc, recently, the promotion of further improvements in mass storage is being attempted by performing the recording even in the depth direction of the optical disc. For example, in I. Ichimura et al, Technical Digest of ISOM'04, pp. 52, Oct. 11-15, 2005, Jeju, Korea, a method is described for performing high capacity storage by forming a plurality of recording layers in the depth direction of the optical disc.

Furthermore, in S. Kobayashi et. al., Technical Digest of International Symposium on Optical Memory 2009, Th-I-01, Oct. 8, 2009, Nagasaki Brick Hall, a void is formed in a recording layer of one layer by the illumination of laser light to change the reflectance. In addition, a mode of a rose type micro reflector is proposed that performs multilayer recording in a pseudo manner by forming a plurality of voids within the same recording layer even in the depth direction.

In the case of performing the recording and the reproduction on the multilayer optical disc as described above, since distances (hereinafter, referred to as cover thickness) from the disc surface to each recording layer and void are different from each other, a spherical aberration as shown in the following formula (1) is generated in the optical spot.

Formula 1

$$W_{40} = \frac{1}{\sqrt{5}} \frac{1}{6} \frac{1}{8} \frac{N^2 - 1}{N^3} NA^4 \frac{t}{\lambda} [\lambda \text{ rms}] \quad (1)$$

N is a refractive index of the disc and is set to, for example, 1.6. In addition, in the same manner as the example of the Blu-ray Disc, when the wavelength of the laser light source $\lambda=405$ nm and the numerical aperture of the object lens NA=0.85, for example, the aberration at a position where the distance from the disc surface is 100 μm becomes 0.46 λrms.

This value is significantly larger than 0.07 rms which is the standard of Marechal known as the index of a diffraction limitation capability, whereby it is an obstacle to performing the multilayer recording and reproduction.

As a method of correcting the spherical aberration, for example, the following methods can be used.

1. A method of using a liquid crystal device
2. A method of generating the aberration by changing the use magnification of the object lens
3. A method of generating the spherical aberration in a relay lens system The first method uses a liquid crystal having the anisotropy in the permittivity and the refractive index. By applying a voltage to an electrode of the liquid crystal, the refractive index is changed. For this reason, with respect to light penetrating the liquid crystal, a change in phase depending on the electrode pattern can be given.

However, in the case of the multilayer disc with more than 10 layers, the recording layer or the void is formed at a position where the distance from the disc surface is large. Thus, there is a necessity to correct very large spherical aberration.

Furthermore, the change given by the liquid crystal as described above is a step-shaped phase change. For this reason, when correcting the large spherical aberration, since, if the change in phase is not continuously accessed, the remaining aberration is not negligible, the electrode pattern should be formed in a detailed and complicated manner.

Moreover, in the second method, if a reverse spherical aberration is generated by changing the magnification to erase the spherical aberration, the aberration on the axis can be corrected. Thus, normally, this method is often used.

However, in the recording and the reproduction of the optical disc, there is a necessity to perform a transverse shift of the object lens to follow the eccentricity of a recording track. In particular, in the case of using the object lens that realizes the wide spherical aberration correction function, it is easy for a coma aberration generated due to the transverse shift to increase.

On the other hand, in a case where light incident to the object lens is parallel light, even if the object lens is subjected to the transverse shift, the coma aberration is not generated. However, to do that, the light incident to the object lens should be configured so as to become parallel light irrespective of the change in magnification. For this reason, the apparatus becomes more complicated and larger.

Furthermore, in the third method, a reverse spherical aberration is generated in a relay lens system. That is, the spherical aberration generated by a difference in cover thickness up to the recording layer or the void is corrected so as to be erased by the spherical aberration of the relay lens system.

However, in the case of this correction method, when the object lens is subjected to the transverse shift, the spherical aberration of the relay lens system, which was just enough to cancel out, deviates from the spherical aberration which is generated by the difference in cover thicknesses, whereby the comma aberration is generated.

SUMMARY OF THE INVENTION

It is desirable to provide a pickup apparatus and a recording and reproduction apparatus that can accurately, simply, and easily perform the recording and the reproduction of information with respect to an optical recording medium which has a plurality of recording and reproduction areas in the depth direction such as recording layers, voids and the like. Moreover, in particular, it is also desirable to reduce the aberration generated due to the transverse shift of the object lens as described above.

Furthermore, similarly, it is desirable to provide a recording and reproduction method that can accurately, simply, and easily perform the recording and the reproduction of information with respect to an optical recording medium which has a plurality of recording areas in the depth direction such as recording layers, voids or the like.

A pickup apparatus according to an embodiment of the present invention includes a light source, and a light separator which is disposed on an optical path of light emitted from the light source and separates light emitted from the light source and the reflected light of an optical recording medium; an object lens that concentrates light which penetrated the light separator on the optical recording medium; a movable lens that is disposed between the light source and the light separator or between the light separator and the object lens and changes an object point position of the object lens by being moved in an optical axis direction; a light sensing element that receives the reflected light from the optical recording medium separated by the light separator.

In each of the optical path from the light source to the object lens and the optical path from the object lens to a light concentration position on the optical recording medium, the spherical aberrations are generated. As a result, when the object lens is subjected to the transverse shift, the two spherical aberrations deviate from each other, whereby the coma aberration is generated.

By the coma aberration, the coma aberration generated by the transverse shift of the object lens is corrected.

A pickup apparatus according to another embodiment of the invention includes a light source, an object lens that concentrates light from the light source on an optical recording medium, a light separator that is disposed between the light source and the object lens and separates light from the light source reflected by the optical recording medium; a liquid crystal aberration correction element that is disposed between the light source and the object lens and generates a spherical aberration in the penetrated light; and a light sensing element that receives the light separated by the light separator.

A coma aberration generated by the transverse shift of the object lens is corrected by a coma aberration that is generated by the deviation of the spherical aberration, which is generated by the liquid crystal aberration correction element, and the spherical aberration which is generated by changing the distance between the object lens and the optical recording medium.

A recording and reproduction apparatus according to an embodiment of the present invention includes the pickup apparatus according to the embodiments of the invention as described above; a signal processing portion that performs the processing of the recording signal to the recording medium or the reproduction signal received by the pickup apparatus and the servo error signal; a rotation drive portion that rotates the optical recording medium; a transport drive portion that moves the pickup apparatus in a diameter direction of the optical recording medium; a drive control portion that drives and controls the rotation drive portion or the transport drive portion, and the pickup apparatus; and a control portion that supplies a drive command to the drive control portion or recording information to be recorded onto the optical recording medium.

Another recording and reproduction apparatus according to another embodiment of the present invention includes another pickup apparatus according to the embodiment of the invention as described above; a signal processing portion that performs the processing of the recording signal to the recording medium or the reproduction signal received by the pickup apparatus and the servo error signal; a rotation drive portion that rotates the optical recording medium; a transport drive portion that moves the pickup apparatus in a diameter direction of the optical recording medium; a drive control portion that drives and controls the rotation drive portion or the transport drive portion, and the pickup apparatus; and a control portion that supplies a drive command to the drive control portion or recording information to be recorded onto the optical recording medium.

In the recording and the reproduction method according to an embodiment of the present invention, spherical aberrations are generated in each of an optical path from a light source for irradiating an optical recording medium with light to an object lens for concentrating the light irradiated by a light source on the optical recording medium, and in an optical path from the object lens to a light concentration position on the optical recording medium.

In addition, when the light incident to the object lens is not parallel light, a coma aberration generated by a transverse shift of the object lens is corrected by a coma aberration generated by the deviation of two spherical aberrations.

According to the pickup apparatus according to the embodiment of the present invention, even if the use magnification of the object lens is changed, it is possible to prevent the occurrence of the coma aberration when the object lens is subjected to the transverse shift. For this reason, the object lens can follow the eccentricity of the recording track of the optical recording medium without generating the aberration.

Furthermore, according to another pickup apparatus according to another embodiment of the present invention, due to the deviation between the spherical aberration generated by the liquid crystal aberration correction element and the aberration generated by changing the distance from the object lens to the optical recording medium surface, it is possible to correct the coma aberration when the object lens is subjected to the transverse shift.

For this reason, even if a ray of light incident to the object lens is not collimated, it is possible to suppress the coma aberration generated by the transverse shift of the object lens.

Furthermore, according to the recording and the reproduction apparatus according to the embodiment of the present invention, even if the use magnification of the object lens is changed, it is possible to prevent the occurrence of the coma aberration when the object lens is subjected to the transverse shift. For this reason, the object lens can follow the eccentricity of the recording track of the optical recording medium without generating a large aberration.

Moreover, according to the recording and the reproduction method according to the embodiment of the present invention, even if the use magnification of the object lens is changed, it is possible to prevent the occurrence of the coma aberration when the object lens is subjected to the transverse shift. For this reason, the object lens can follow the eccentricity of the recording track of the optical recording medium without generating a large aberration, thereby performing the recording and the reproduction.

According to the present invention, even if the use magnification of the object lens is changed, it is possible to make the object lens follow the eccentricity of the recording track of the optical recording medium while suppressing the aberration. For this reason, it is possible to accurately perform the recording or the reproduction, even with respect to the optical recording medium having the recording areas at positions where the distances from the surface thereof are different from each other.

DESCRIPTION OF THE PREFERRED EMBODIMENTS

Hereinafter, examples of preferred embodiments for carrying out the present invention will be described, but the present invention is not limited the following examples.

Figure 1:
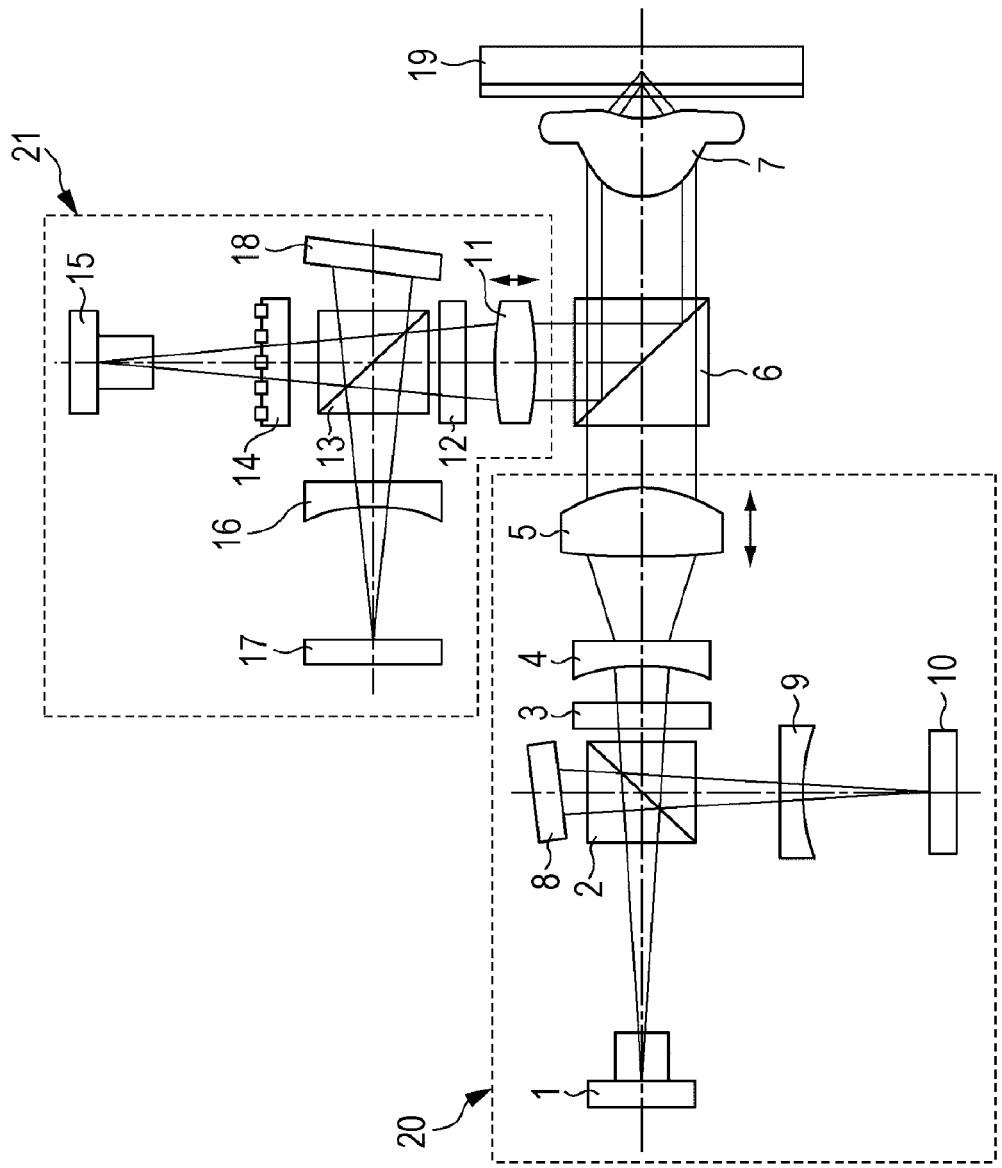
FIG. 1 is a schematic configuration diagram showing a pickup apparatus according to a first embodiment of the present invention.

The description will be performed in the following order.
1. First Embodiment (A Pickup Apparatus Suitable for Multilayer Optical Recording Medium)
2. Second Embodiment (A Pickup Apparatus Suitable for Two Layer Optical Recording Medium)
3. Third Embodiment (A Pickup Apparatus Suitable for Optical Recording Medium with One Recording Layer)
4. Fourth Embodiment (A Recording and Reproduction Apparatus)
1. First Embodiment
1-1. Pickup Apparatus FIG. 1 is a schematic configuration diagram showing a configuration of a pickup apparatus 100 according to the present embodiment.

The pickup apparatus 100 according to the present embodiment has a first optical system 20 for recording and reproducing a RF signal to an optical recording medium 19, and a second optical system 21 for acquiring a servo signal.

Furthermore, a light ray synthesizer 6 for synthesizing light rays emitted from the first optical system 20 and the second optical system 21, and an object lens 7 for respectively concentrating the synthesized light to the optical recording medium 19 are additionally included.

The first optical system 20, for example, includes a light source 1, a polarization beam splitter 2 and a ¼ wavelength plate 3 as separators that separates light emitted from the light source 1 from the reflected light from the optical recording medium 19. Furthermore, the first optical system 20 includes a fixed lens 4 that refracts the light which penetrated the ¼ wavelength plate 3, for example, in a divergence direction. Furthermore, the first optical system 20 has a movable lens 5 that is disposed on an optical path of the light which penetrated the fixed lens 4 and can perform slide movement in an optical axis direction.

Moreover, the first optical system 20 has a light concentration lens 9 for concentrating the reflected light from the optical recording medium 19 separated by the polarization beam splitter 2, and a light sensing element 10 for receiving the reflected light.

For example, a blue violet semiconductor laser having the wavelength of 405 nm can be used in the light source 1. The laser light emitted from the light source 1 penetrates the polarization beam splitter 2 and the ¼ wavelength plate 3 and is incident to the fixed lens 4. In addition, the polarization beam splitter 2 reflects a part of the laser light from the light source 1 and the reflected light is received by the light sensing element 8. Based on the intensity of the laser light received by the light sensing element 8, the output of the light source 1 can be controlled, for example, by an APC (Auto Power Control) circuit (not shown) or the like.

The laser light incident to the fixed lens 4 is refracted by the fixed lens 4 in a divergence direction and is incident to the movable lens 5. Furthermore, the laser light incident to the movable lens 5 is, for example, collimated, incident to the ray synthesizer 6 and penetrates the ray synthesizer 6. In addition, by being incident to the object lens 7, the laser light is concentrated on the recording and the reproduction area of the optical recording medium 19. In addition, the numerical aperture of the object lens 7 is 0.85.

The object lens 7 can move in a diameter direction and a normal direction of the optical recording medium 19, for example, by a two axis motor, a two axis actuator (not shown) or the like. As a result, the transverse shift is performed to follow the eccentricity of the track of the optical recording medium 19, and a distance (WD: Working Distance) from the object lens 7 to the optical recording medium 19 surface is controlled.

Furthermore, the movable lens 5 performs slide movement in an optical axis direction, for example, by an actuator, a motor (not shown) or the like. By the slide movement, the object point position of the object lens 7 can be changed.

Moreover, the laser light concentrated by the object lens 7 is reflected by the optical recording medium 19, penetrates the object lens 7, the ray synthesizer 6, the movable lens 5, and the fixed lens 4, and is incident to the ¼ wavelength plate 3 again. In this manner, since the reflected light from the optical recording medium 19 penetrates the ¼ wavelength plate 3 twice in the back and forth path, the polarization direction is rotated by 90°, whereby the reflected light is reflected by the polarization beam splitter 2.

In addition, the laser light reflected by the polarization beam splitter 2 is concentrated on the light sensing element 10, for example, by the light concentration lens 9, whereby the RF signal is acquired herein.

In this manner, in the first optical system 20, the reading of the RF signal with the recording information mounted thereon or the recording of information is performed with respect to the optical recording medium 19.

On the other hand, in the second optical system 21, signals used in the servo control such as a tracking error signal or a focus error signal or the like are acquired.

The second optical system 21 includes, for example, a light source 15, a luminous flux division element 14 which divides light from the light source 15 into a plurality of rays, and a movable lens 11 which is disposed on an optical path of ray divided by the luminous flux division element 14 and can perform slide movement in an optical axis direction.

Furthermore, the second optical system 21 includes, as separators of light reflected by the optical recording medium 19, a polarization beam splitter 13 disposed between the luminous flux division element 14 and the movable lens 11, and a ¼ wavelength plate 12. In addition, the second optical system 21 includes a light sensing element 17 that receives light separated by the polarization beam splitter 13.

For example, a red semiconductor laser having the wavelength of 650 nm can be used in the light source 15. The laser light emitted from the light source 15 is incident to, for example, the luminous flux division element 14 such as a diffraction grid or the like and is divided into a plurality of luminous fluxes. By the divided luminous fluxes, it is possible to form a side spot that is used in, for example, the calculation of the tracking error signal.

The luminous fluxes divided by the luminous flux division element 14 penetrate the polarization beam splitter 13 and the ¼ wavelength plate 12, and, for example, are incident to the movable lens 11 which includes a convex lens. Furthermore, a part of the laser light incident to the polarization beam splitter 13 is reflected and is received by the light sensing element 18. Based on the quantity of light received by the light sensing element 18, the output of the light source 15 is controlled by an APC circuit (not shown) or the like.

In addition, the laser light which penetrated the movable lens 11 is, for example, reflected by the ray synthesizer 6 such as a dichroic mirror, incident on the object lens 7 and concentrated on the optical recording medium 19.

Furthermore, when the object lens 7 is moved in a normal direction of the optical recording medium 19 to change the WD, it is possible to regulate the focus position by performing slide movement of the movable lens 11 in the optical axis direction.

The laser light reflected by the optical recording medium 19 is reflected by the ray synthesizer 6 again and is incident to the ¼ wavelength plate 12 when having penetrated the movable lens 11. In order for the ¼ wavelength plate 12 to be penetrated twice in the back and forth path, the polarization direction is rotated by 90°, whereby the laser light is reflected in the polarization beam splitter 13.

In addition, the laser light reflected by the polarization beam splitter 13 is concentrated, for example, by the light concentration lens 16 and is received by the light sensing element 17.

In the light sensing element 17, the current signal depending on the light sensing amount is generated, thereby acquiring the focus error signal, the tracking error signal or the like. In the light concentration lens 16, for example, by using a cylindrical lens to give the laser light an astigmatism, the focus error signal can be acquired by the astigmatism method.

Figure 2:
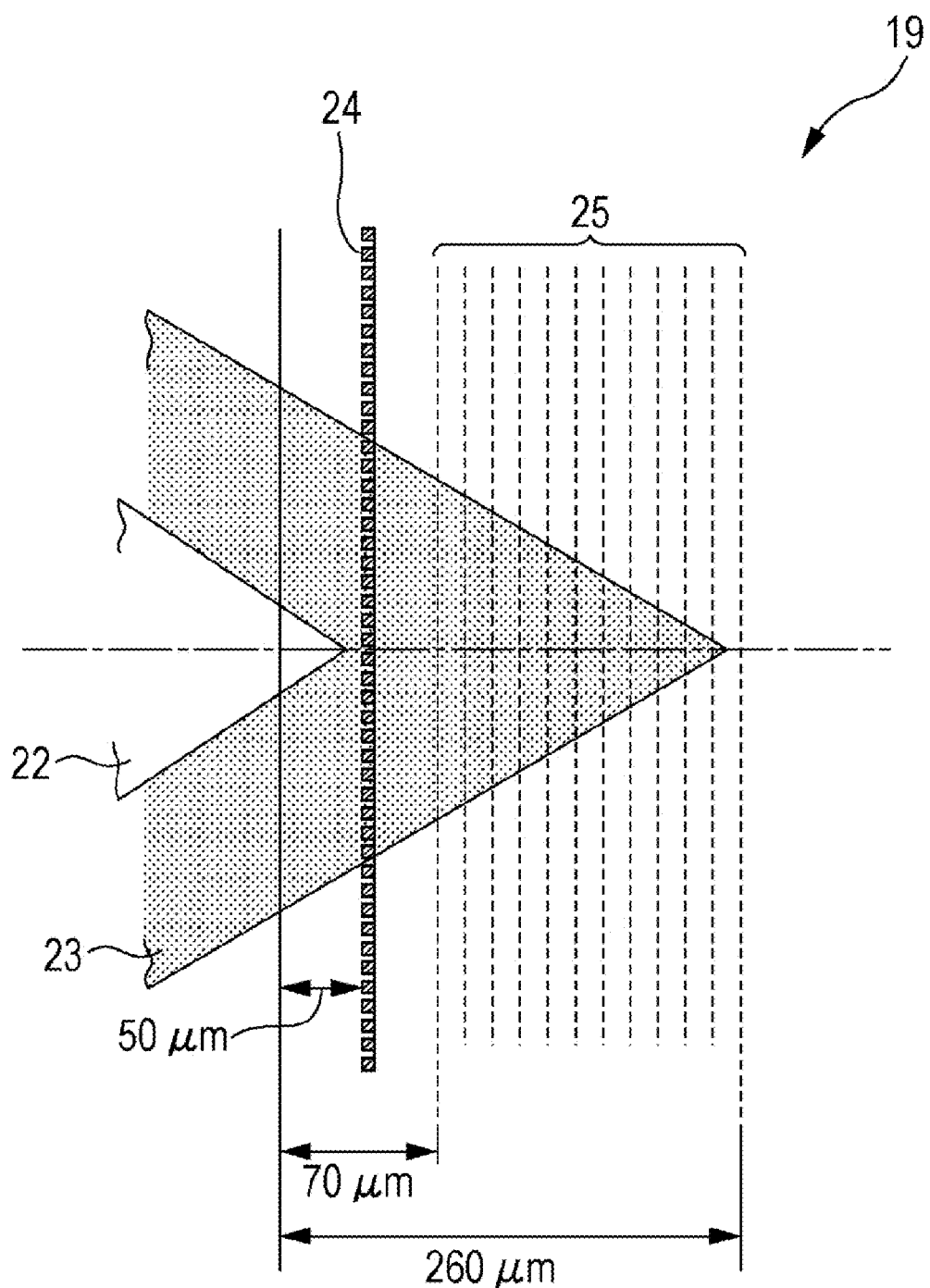
FIG. 2 is a sectional view showing a figure in which the recording and the reproduction on an optical recording medium is performed using the pickup apparatus according to the first embodiment.

FIG. 2 is a sectional diagram showing a figure in which the laser light is concentrated on the optical recording medium 19. For example, a land/groove 24 is formed at a position of 50 μm from the surface of the optical recording medium 19. In addition, the laser light from the light source 15 is concentrated on the land/groove 24 and is reflected, as shown in a light cone 22, thereby creating the focus error signal or the tracking error signal.

On a lower layer than the land/groove 24, the recording and the reproduction area is formed, so that, for example, the recording and the reproduction is performed at positions of 50 μm to 300 μm from the surface. For example, as shown in the light cone 23, the laser light from the light source 1 is concentrated on the area, thereby generating the void. That is, by forming an area with reflectance changed by the void, information can be recorded.

In addition, the voids are, for example, formed for each 10 μm in the depth direction, which makes it possible to form a pseudo multilayer structure of 20 layers or more. For example, in FIG. 2, an example is shown in which pseudo multilayer structures 25 are formed at positions of 70 μm to 260 μm from the surface.

When concentrating the laser light at positions where the distances from the optical recording medium 19 are different from each other, the spherical aberration is generated in the light concentration spot. In the present embodiment, the object lens 7 is controlled so that the laser light from the light source 15 is concentrated on the land/groove 24.

In addition, by causing the movable lens 5 to slide in a state in which the servo spans the object lens 7, the object point can be moved. As a result, it is possible to correct the spherical aberration generated in the spot of the laser light from the light source 1.

Figure 3A:
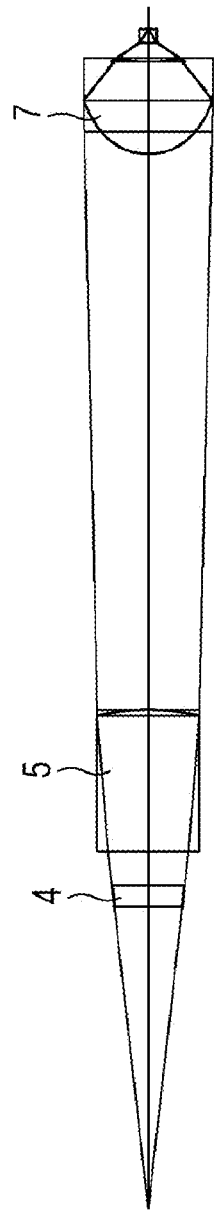
FIGS. 3A to 3C are side views showing figures in which a movable lens slides in the pickup apparatus according to the first embodiment.
Figure 3B:
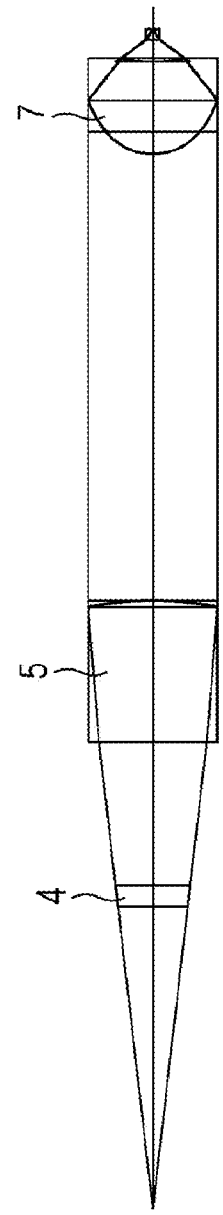
Figure 3C:
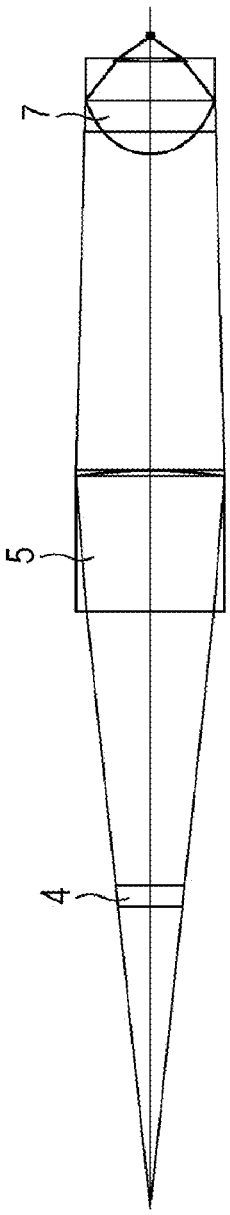

FIGS. 3A to 3C show an example of the slide movement of the movable lens 5. FIG. 3B shows a state in which light which penetrated the fixed lens 4 accurately becomes parallel light by the movable lens 5, whereby the object point position relative to the object lens 7 becomes infinity. On the contrary, as shown in FIG. 3A, when causing the movable lens 5 to slide to the fixed lens 4 side, the rays are refracted in the divergence direction. At this time, the object point relative to the object lens 7 is moved to the right side in the drawings, that is, to a side approaching from the object lens 7, and the light concentration position on the optical recording medium is moved to a position separated away from the optical recording medium surface.

Furthermore, as shown in FIG. 3C, when causing the movable lens 5 to slide to the object lens 7 side, the rays are refracted in a convergence direction. In addition, at this time, the light concentration position on the optical recording medium is moved to a side approaching from the optical recording medium surface.

Figure 4:
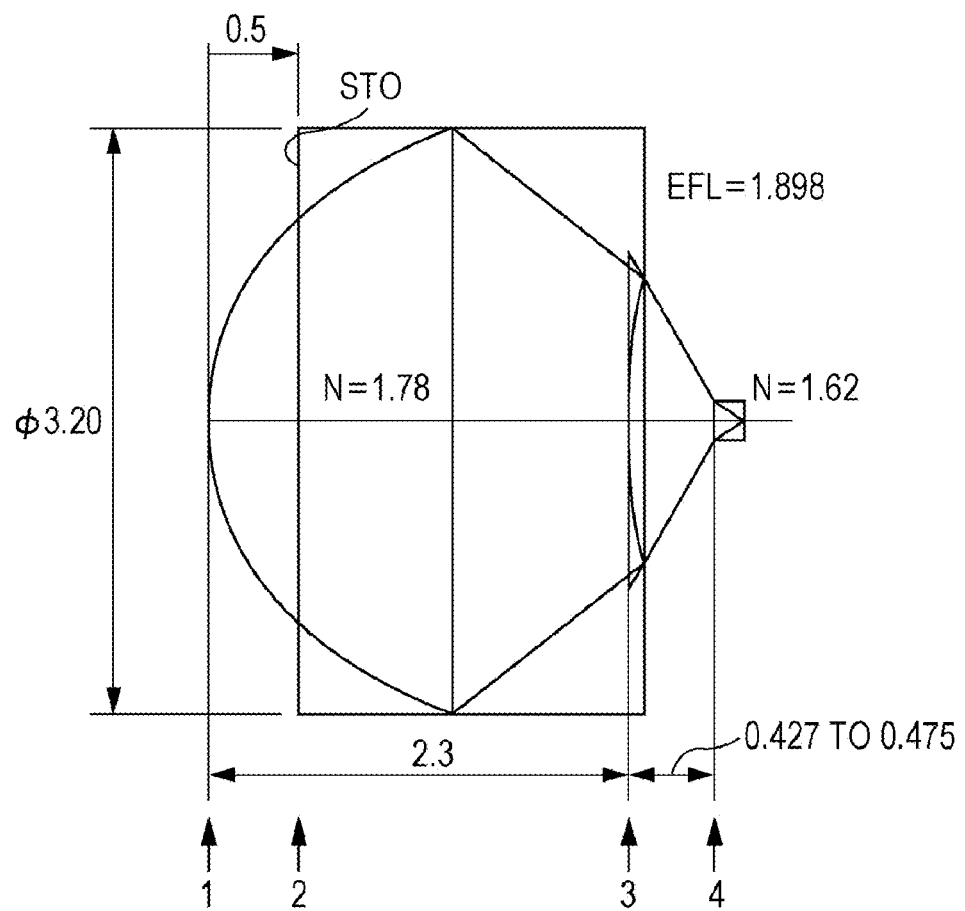
FIG. 4 is a sectional view showing a design example of an object lens.

In addition, a design example of the fixed lens 4, the movable lens 5, and the object lens 7 will be described hereinafter. Firstly, FIG. 4 is a sectional view of the object lens 7. A glass material having the reflective index of 1.78 is used, a lens diameter is 3.2 mm, and a distance from a first surface to a third surface, i.e., a lens thickness on the optical axis is 2.3 mm. Furthermore, the distance from a first surface peak to a second surface that is a STO (aperture) surface is 0.5 mm. In addition, an effective focus distance is 1.62 mm.

Furthermore, a fourth surface is an optical recording medium surface and the WD by changing WD from 0.427 nm to 0.475 mm can be used in this example.

DESIGN EXAMPLE 1

Object Lens 7

| surface data surface Number | radius of curvature r | surface gap d | refractive index n (405 nm) |
|---|---|---|---|
| 1* | 1.72407 | 0.5 | 1.78006964 |
| 2 (STO) | ∞ | 1.8 | |
| 3* | 1.390896 | 0.46 | 1.0 |
| 4 | ∞ | 0.1 | 1.62 |

Aspheric Data

A First Surface

K = 0.0000, A2 = 6.033061E−02, A4 = 4.110059E−03,
A6 = 1.577992E−04, A8 = 3.361266E−04
A Third Surface K = 0.0000, A2 = −3.130214E−01, A4 = 2.320173E−01,
A6 = −2.841429E−01, A8 = 1.483011E−01

DESIGN EXAMPLE 2

Movable Lens 5

| surface data surface Number | radius of curvature r | surface gap d | refractive index n (405 nm) |
|---|---|---|---|
| 1* | 43.20333 | 3.5 | 1.5071781 |
| 2* | −7.841247 | | |

Aspheric Data

A First Surface

K = 0.0000, A2 = −9.312825E−06, A4 = −1.015113E−05
A Second Surface

K = 0.875969, A2 = 4.279362E−04, A4 = 4.787842E−06

DESIGN EXAMPLE 3

Fixed Lens 4

| surface data surface Number | radius of curvature r | surface gap d | refractive index n (405 nm) |
|---|---|---|---|
| 1 | ∞ | 0.5 | 1.53019593 |
| 2 | ∞ | | |

Aspheric Data
A Second Surface

A2 = 5.0017045E−3, A4 = −1.0916955E−3, A6 = 1.3797693E−3

The spherical aberration is generated by a change in WD described above, which makes it possible to erase and correct the aberration that is hard to completely eliminate only by the slide movement of the movable lens 5. Furthermore, at this time, together with the change in WD, by causing the movable lens 11 to slide in the optical axis direction in the second optical system 21, the laser light from the light source 15 is regulated so as to be concentrated on the land/groove 24.

Figure 5:
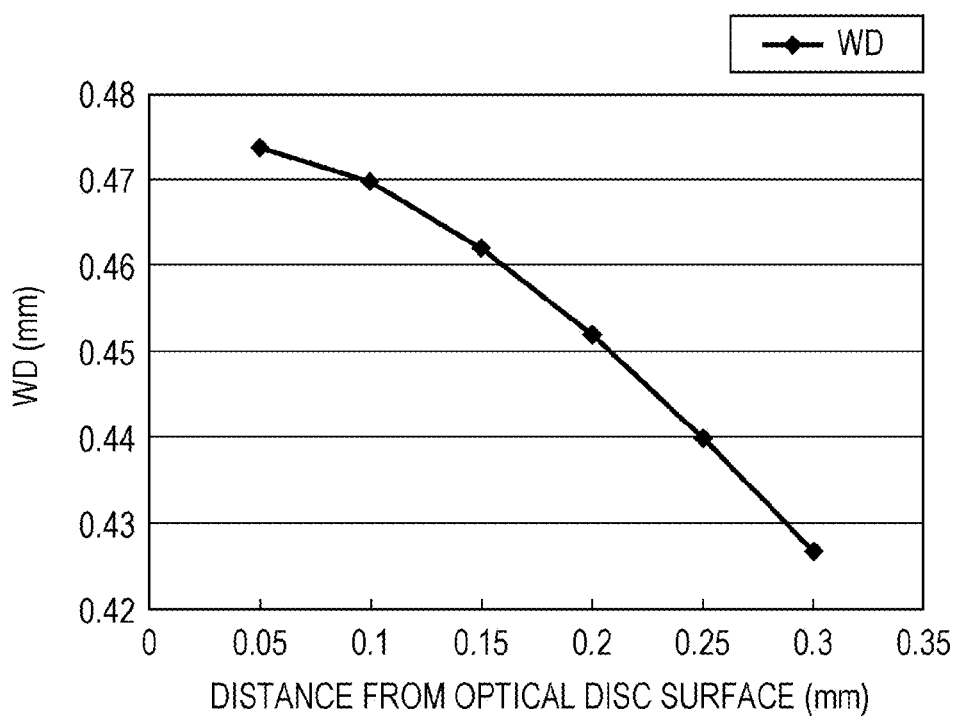
FIG. 5 is an explanation diagram showing a relationship between a distance from an optical recording medium surface and an optimal WD when performing the recording and the reproduction at the position thereof. The vertical axis thereof shows the distance from an object lens to an optical recording medium surface, and the horizontal axis thereof shows the distance from the optical recording medium surface to a recording area.

FIG. 5 shows that WD, when the movable lens 5 and the object lens 7 are moved in this manner to optimally perform the correction, is obtained with respect to the distance (the cover thickness) from the surface of the optical recording medium 19 to a position where the recording and the reproduction is performed.

Figure 6:
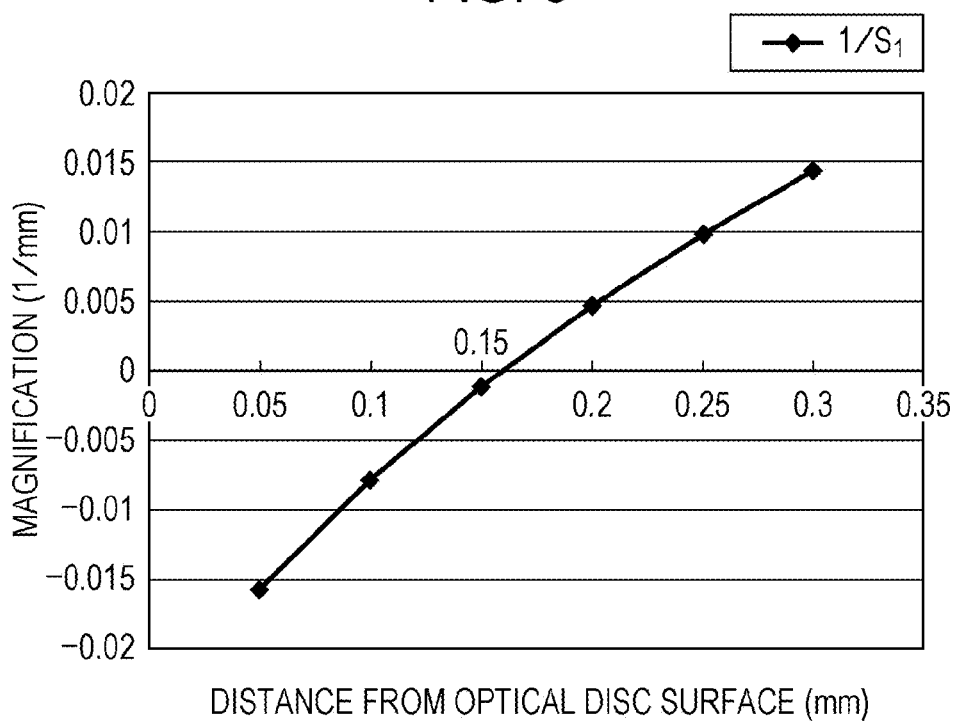
FIG. 6 is an explanation diagram showing a relationship between a distance from an optical recording medium surface to a place where the recording and the reproduction are performed and a distance from a STO surface of an object lens to an object point during recording and reproduction.

Furthermore, FIG. 6 shows that the distance from the STO surface of the object lens 7 to the object point with respect to the distance from the surface of the optical recording medium 19 to the place where the recording and the reproduction are performed, when the correction has been performed. In addition, a vertical axis shows an inverse number of the distance from the STO surface of the object lens 7 to the object point, instead of the magnification.

In addition, herein, the lens disposed at the object lens 7 side is moved in the optical axis direction as the movable lens 5, and the lens disposed at the light source 1 side is fixed as the fixed lens 4.

However, of course, even when the lens disposed at the object lens side is fixed and the lens disposed at the light source side is moved in the optical axis direction, the use magnification of the object lens can be changed.

Figure 7:
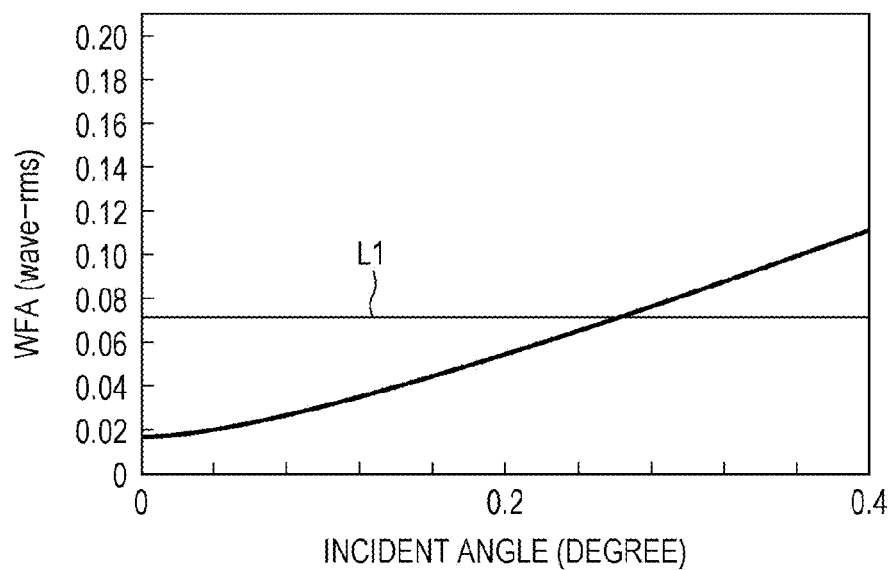
FIG. 7 is an explanation diagram showing a view angle property of an object lens.
Figure 8:
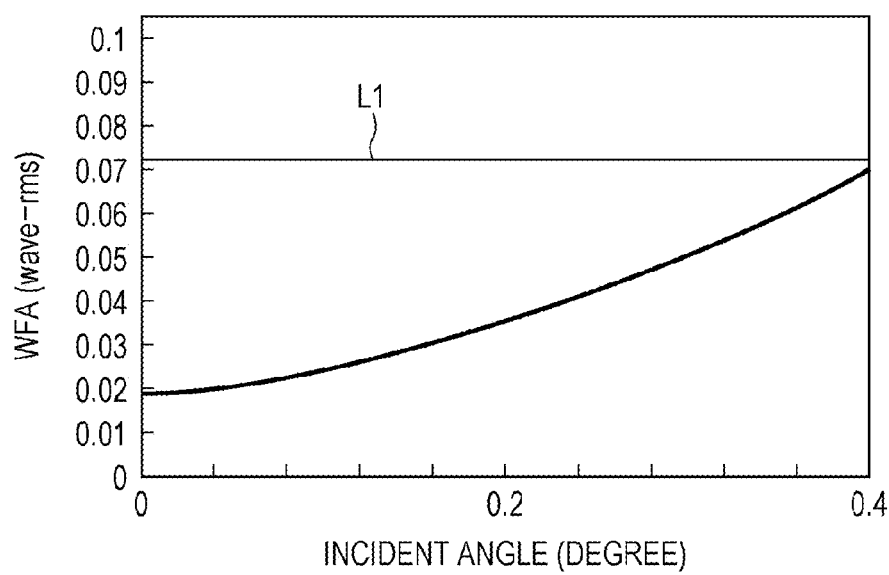
FIG. 8 is an explanation diagram showing a view angle property of an object lens.
Figure 9:
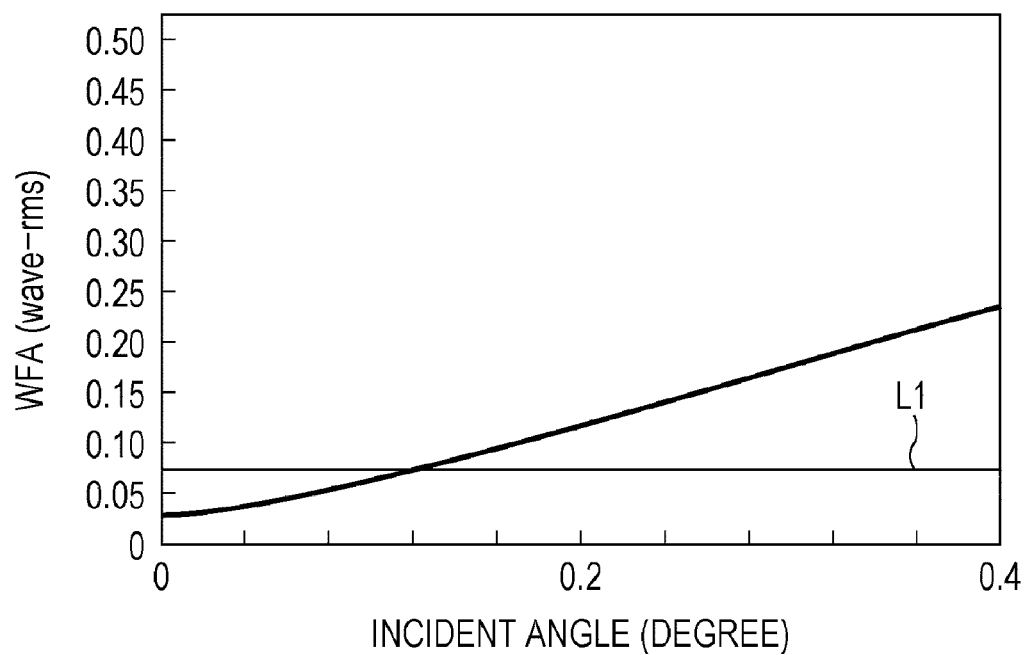
FIG. 9 is an explanation diagram showing a view angle property of an object lens.

Next, when the WD shown in FIG. 5 is set so that the recording and the reproduction is performed at positions where distances from the surfaces of the optical recording medium 19 are 0.05 mm, 0.16 mm, and 0.30 mm, view angle properties of the object lens 7 single body are respectively shown in FIGS. 7 to 9.

Furthermore, in FIGS. 7 to 9, the horizontal axis is an angle of a main ray incident to the object lens, and the vertical axis is a wave surface aberration. In addition, the incident light is obtained as the wavelength of 405 nm.

As shown in FIG. 8, when the recording and the reproduction is performed at a position where the distance from the surface of the optical recording medium 19 is 0.16 mm, for all of the incident angles, the aberration is included in the diffraction limitation shown in line L1, thereby showing a satisfactory view angle property.

Furthermore, in the surface where the distance from the optical recording medium 19 is 0.05 mm, as shown in FIG. 7, if the incident angle increases, the aberration exceeds the diffraction limitation.

Moreover, in the surface where the distance from the optical recording medium 19 is 0.30 mm, as shown in FIG. 9, the aberration considerably increases with respect to the light having the large incident angle.

Figure 10A:
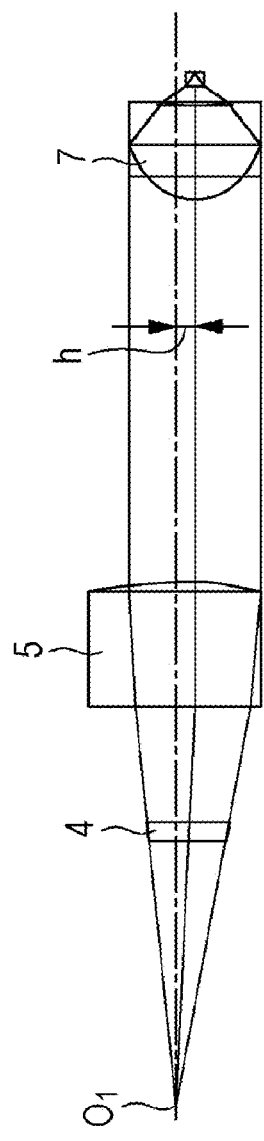
FIG. 10A is a sectional diagram showing a figure in which an object lens is subjected to a transverse shift when light incident to the object lens is parallel light.

When the distance from the surface of the optical recording medium 19 is 0.16 mm, as is apparent from FIG. 6, the object point distance relative to the object lens 7 becomes infinity. That is, as shown in FIG. 10A, it is apparent that the light from the light source $O_1$, which penetrated the fixed lens 4 and the movable lens 5 and is incident to the object lens 7, becomes nearly parallel light.

Thus, even if the object lens 7 follows the eccentricity of the track of the optical recording medium 19 and is subjected to the transverse shift only by a distance h, the incident angle of light incident to the object lens 7 is not changed, so that the aberration does not increase.

Figure 10B:
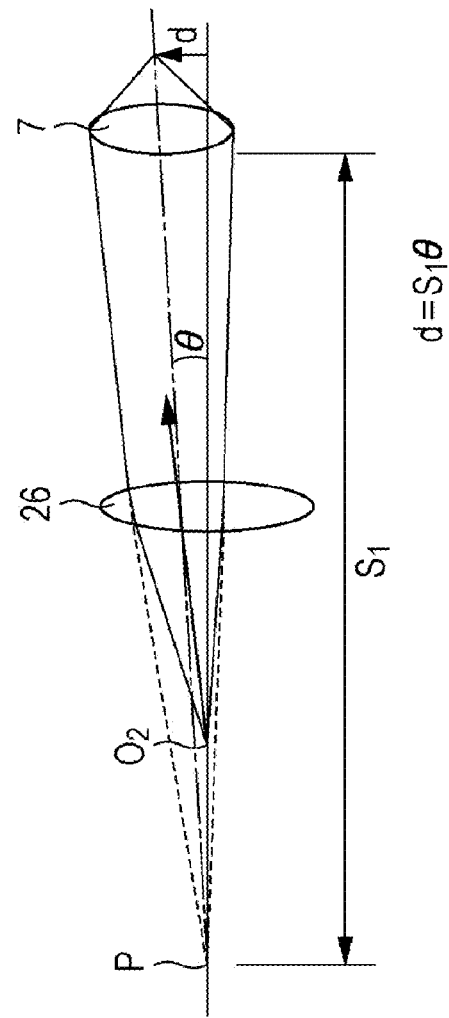
FIG. 10B is a sectional diagram showing a figure in which an object lens is subjected to a transverse shift when light incident to the object lens is not parallel light.

On the contrary, as shown in FIG. 10B, when the object point P is not infinity, light emitted from the light source $O_2$ does not become parallel light after penetrating the lens 26 but becomes, for example, divergent light. In addition, in the drawings, the fixed lens 4 and the movable lens 5 are combined and represented by the lens 26.

In this case, when the object lens 7 is subjected to the transverse shift, the angle of ray incident to the object lens 7 is changed so that a sight d of the object lens 7 is indicated by $d=S_1\theta$, when a distance from the object point P to the object lens 7 is $S_1$ and the view angle of the object lens 7 is $\theta$.

Thus, for example, in the case of performing the recording and the reproduction at positions where the distances from the surface of the optical recording medium 19 are respectively 0.05 mm and 0.30 mm, when the object lens 7 is subjected to the transverse shift, there is an increase in the rays having the large incident angle, whereby the aberration increases because of the view angle properties shown in FIGS. 7 and 9. The aberrations are mostly tertiary coma aberrations.

In order to follow the eccentricity of the recording track of the optical recording disc or the like, there is a necessity for the transverse shift amount of at least 0.1 mm. Considering the margin due to the error of the optical disc, the actuator or the like, even with the transverse shift of 0.15 mm, it is desirable that the aberration is included in the diffraction limitation.

Figure 11:
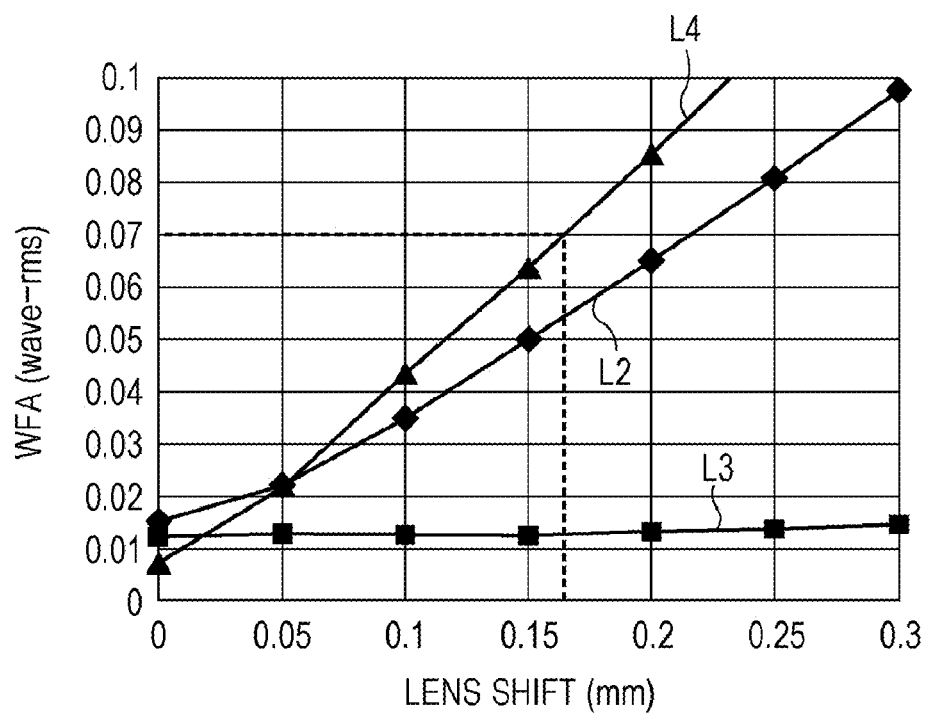
FIG. 11 is an explanation diagram showing a relationship between a transverse shift amount of an object lens and a wave surface aberration thus generated.

When performing the recording and the reproduction in positions where the distances from the optical recording medium surface are 0.05 mm, 0.16 mm, and 0.30 mm, the aberration in the case where the object lens 7 is subjected to the transverse shift is shown in FIG. 11. A horizontal axis thereof indicates a distance by which the object lens 7 is subjected to the transverse shift, and a vertical axis thereof indicates a wave surface aberration.

A line L2 is a case where the distance from the optical recording medium surface is 0.05 mm, a line L3 is a case where the distance from the optical recording medium surface is 0.16 mm, and a line L4 is a case where the distance from the optical recording medium surface is 0.30 mm.

It is apparent from the drawing that, if the transverse shift is equal to or less than 0.16 mm, for any of the three positions, the aberration can be equal to or less than 0.07 λrms that is the diffraction limitation.

In a case where the recording and the reproduction is performed at a position where the distance from the optical recording medium surface is 0.16 mm, as described above, the light incident to the object lens 7 is nearly parallel light. For this reason, as shown in the line L3, even if the object lens 7 is subjected to the transverse shift, the aberration hardly changes.

On the other hand, in a case where the distances from the optical recording medium surface are 0.05 mm and 0.30 mm, when the object lens 7 is subjected to the transverse shift, there is an increase in the incident angle of the ray incident to the object lens 7. For this reason, as shown in lines L2 and L4, as the object lens 7 is subjected to the transverse shift, there is an increase in the coma aberration mentioned above.

In the present embodiment, when the rays incident to the object lens are not parallel light, the coma aberration generated by the transverse shift of the object lens can also be corrected.

Figure 12:
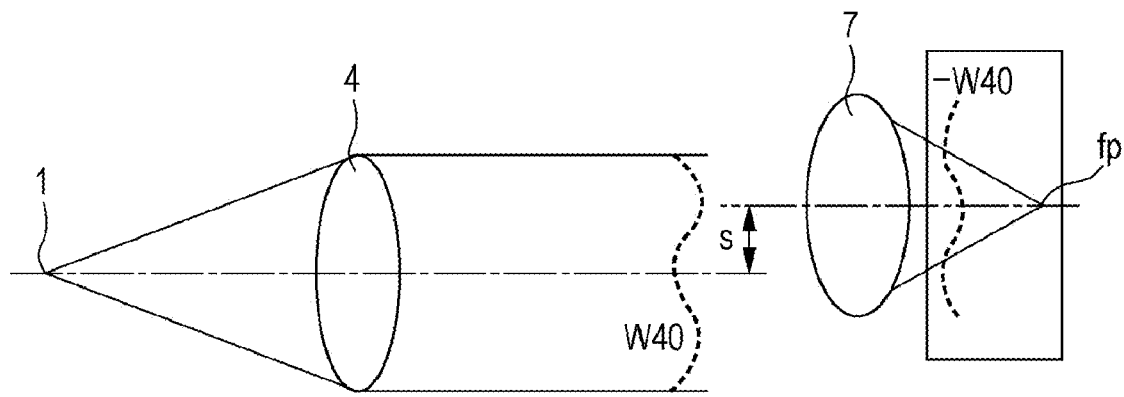
FIG. 12 is an explanation diagram showing a figure when a reverse aberration is generated in an optical path from a light source to an object lens and an optical path from the object lens to a focus position and the object lens is subjected to a transverse shift.

For example, as shown in FIG. 12, the spherical aberration of W40 is generated on the optical path from the light source 1 to the object lens 7, and the spherical aberration of −W40 is generated from the object lens 7 to the focus position fp.

Then, when there is no transverse shift of the object lens 7, since the spherical aberrations erase each other, they do not affect the recording and the reproduction to the optical recording medium.

On the contrary, for example, when the object lens 7 is subjected to the transverse shift only by the distance S, due to the deviation of the spherical aberration generated from the light source 1 to the optical lens 7 and the spherical aberration generated from the object lens 7 to the focus position fp, the coma aberration is generated. The coma aberration mentioned above can be erased by this coma aberration.

That is, in the present embodiment, the spherical aberration, which is generated when performing the recording and the reproduction at positions where the distance from the surface of the optical recording medium 19 are different from each other, is corrected by causing the movable lens 5 to slide.

In addition, by the coma aberration generated by a deviation of the spherical aberration to be generated in the optical path from the light source 1 to the object lens 7 and the spherical aberration to be generated in the optical path from the object lens 7 to the focus position, the coma aberration generated by the transverse shift of the object lens 7 is corrected.

In particular, in the present embodiment, the spherical aberration generated in the optical path from the light source 1 to the object lens 7 can be generated, for example, by the fixed lens 4.

Furthermore, the spherical aberration generated in the optical path from the object lens 7 to the focus position can be generated, for example, by moving the object lens 7 in the normal direction of the optical recording medium 19 to change the WD.

Figure 13:
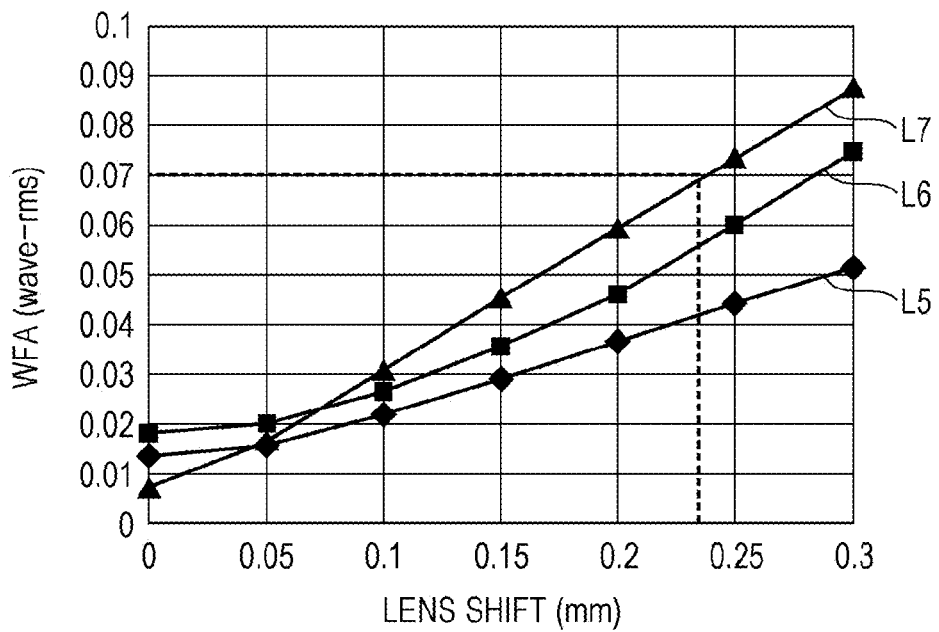
FIG. 13 is an explanation diagram showing a relationship between a transverse shift amount of an object lens and a wave surface aberration thus generated.

FIG. 13 shows the aberration amount relative to the transverse shift of the object lens 7 in the case of performing the correction of the coma aberration in this manner.

The spherical aberration of W40=0.067 λrms is given to the fixed lens 4, whereby, when there is no transverse shift of the object lens 7, the WD is adjusted so as to erase the spherical aberration. In addition, the object lens 7 is subjected to the transverse shift, thereby the aberration is obtained relative to the amount of the respective transverse shift.

Furthermore, a line L5 is a case where the recording and the reproduction is performed at a position where the distance from the optical recording medium surface is 0.05 mm, and a line L6 is a case where the recording and the reproduction is performed at a position where the distance from the optical recording medium surface is 0.16 mm. Moreover, a line L7 is a case where the recording and the reproduction is performed at a position where the distance from the optical recording medium surface is 0.30 mm.

Moreover, at this time, the WD and the movement amount of the movable lens 5 are set to the values shown in FIGS. 5 and 6.

In the present embodiment, on the optical path from the light source 1 to the object lens 7, the spherical aberration is generated in the fixed lens 4. In the case of performing the recording and the reproduction at a position where the distance from the surface of the optical recording medium 19 is 0.16 mm, the ray incident to the object lens 7 slightly deviates from parallel light.

For this reason, since the coma aberration is generated by the transverse shift of the object lens 7, the aberration is hardly changed in the line L3 of FIG. 11, but in the line L6 of FIG. 13, the aberration amount increases as much as the transverse shift of the object lens 7. However, the aberration when the transverse shift of the object lens 7 is 0.25 mm is small, approximately 0.044 arms, whereby it is possible to secure resolution which is enough to perform the recording and the reproduction.

In addition, as shown in the lines L5 and L7, in the case of performing the recording and the reproduction at positions where the distances from the optical recording medium surface are 0.05 mm and 0.30 mm, it is possible to drastically reduce the aberration as compared to FIG. 11.

From this, it is apparent that the coma aberration generated by the transverse shift of the object lens 7 can be effectively erased by the coma aberration, which is generated by the deviation between the spherical aberration generated by the fixed lens 4 and the spherical aberration generated by deviation of the WD.

For this reason, even in regard to the recording and the reproduction positions where the distances from the optical recording medium surface are different from each other, the light concentration at a very high resolution is possible, whereby it is possible to accurately perform the recording and the reproduction even in a multilayer recording optical disc or a micro reactor type of optical disc.

Furthermore, according to FIG. 13, if there is a transverse shift of at least up to 0.23 mm, the aberration can be suppressed within the diffraction limitation. Thus, since it is possible to allow for a large margin when manufacturing and a strict specification is not asked for, simpler and easier production is possible, and provision at a low cost is possible.

In addition, an example, in which the spherical aberration in the optical path from the light source 1 to the object lens 7 is generated by the fixed lens 4, has been described herein, if the spherical aberration is generated within the optical path, it may be generated by other parts and methods.

Figure 14:
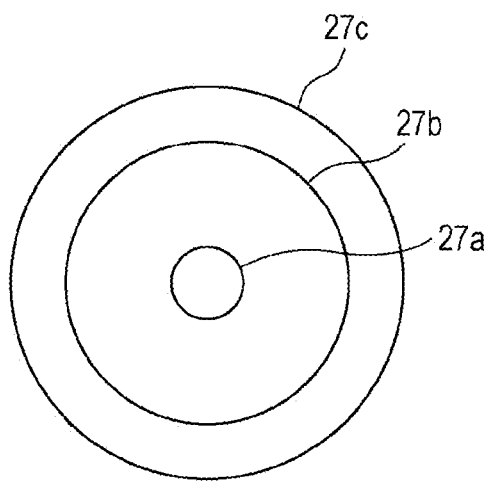
FIG. 14 is a schematic configuration diagram showing a configuration of a liquid crystal element.

For example, the spherical aberration may be generated by inserting a liquid crystal element 27 as shown in FIG. 14 between the light source 1 and the object lens 7.

For example, a plurality of concentric electrodes 27a, 27b and 27c is disposed on the liquid crystal element 27, so that the refractive index is changed by applying a voltage to the pattern to orientate the liquid crystal, whereby the phase of the penetrated light can be adjusted.

Moreover, additionally, the spherical aberration can be also generated by changing the phase by an expander lens or a PLZT ((Pb, La) (Zr, Tr)$O_3$). Furthermore, the spherical aberration may be generated by the movable lens 5.

2. Second Embodiment

In the first embodiment, the description was given as an example in which the present invention is applied to the multilayer recording optical medium, or the optical recording medium having the pseudo multilayer structure by the micro reactor mode or the like.

Figure 15:
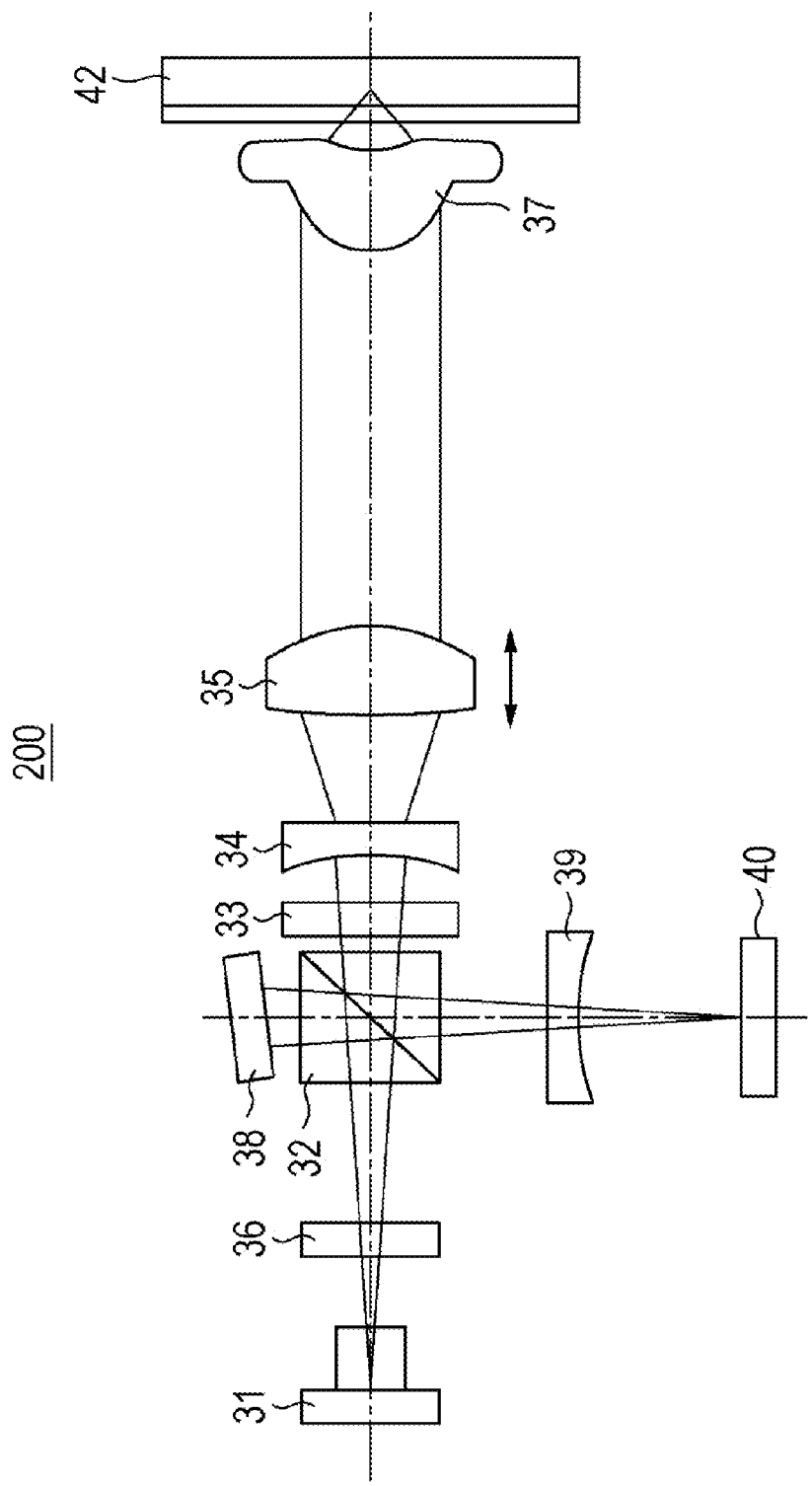
FIG. 15 is a schematic configuration diagram showing a pickup apparatus according to a second embodiment.

Herein, in regard to an example of being applied to an optical disc having two recording layers, a pickup apparatus 200 according to another embodiment of the present invention will be described using FIG. 15.

The pickup apparatus 200 according to the present embodiment includes a light source 31 for illuminating the illumination light, and a luminous flux division element 36 disposed on the optical path of light emitted from the light source 31.

Furthermore, the pickup apparatus 200 includes a polarization beam splitter 32 which is disposed on the optical path of light which has been divided by the luminous flux division element 36 and reflects the reflected light from the optical recording medium 42, and a ¼ wavelength plate 33 which is disposed on the optical path of light from the light source 31 which penetrated the polarization beam splitter 32.

Moreover, the pickup apparatus 200 includes a fixed lens 34, which is disposed on the optical path of light which penetrated the ¼ wavelength plate 33, and a movable lens 35 which is disposed on the optical path of light which penetrated the fixed lens 34 and performs slide movement in the optical axis direction.

In addition, the pickup apparatus 200 includes an object lens 37 which concentrates light which penetrated the movable lens 35 on the optical recording medium 42.

Moreover, the pickup apparatus 200 includes a light concentration lens 39, which concentrates the reflected light from the optical recording medium 42 reflected by the polarization beam splitter 32, and a light sensing element 40 which receives light concentrated by the light concentration lens 39.

In a case where the optical recording medium 42 is, for example, a CD or a DVD having two recording layers, a red semiconductor laser having the wavelength of 650 nm can be used in the light source 1. Furthermore, for example, in the case of being used in the recording and the reproduction on a Blu-ray Disc having two recording layers, a blue violet semiconductor laser having the wavelength of 405 nm can be used.

The laser light emitted from the light source 31 is divided into a plurality of rays, for example, by a luminous flux division element 36 such as a diffraction grid. The divided rays can form side spots which are used, for example, in the calculation of the tracking error signal.

The rays divided by the luminous flux division element 36 penetrate the polarization beam splitter 32 and the ¼ wavelength plate 33 and are incident to the fixed lens 34. In addition, a part of the light is reflected by the polarization beam splitter 32 and is received by the light sensing element 38. Based on the quantity of light received by the light sensing element 38, the output of the light source 31 can be controlled by an APC circuit (not shown) or the like.

The rays incident to the fixed lens 34 are refracted in the divergent direction and are incident to the movable lens 35 which is constituted by, for example, a collimator lens or the like.

In addition, the rays which penetrated the movable lens 35 are concentrated on the optical recording medium 42 by the object lens 37.

The rays reflected by the optical recording medium 42 penetrate the object lens 37, the movable lens 35, the fixed lens 34, and the ¼ wavelength plate 33, and are incident to the polarization beam splitter 32.

Since the reflected light from the optical recording medium 42 penetrates the ¼ wavelength plate 33 twice in the back and forth path, so that the polarization direction thereof is rotated by 90°, thereby the reflected light is reflected in the polarization beam splitter 32.

The light reflected by the polarization beam splitter 32 is concentrated on the light sensing element 40 by the light concentration element 39, whereby the RF signal, the focus error signal, or the tracking error signal is acquired.

Even in the present embodiment, the movable lens 35 can perform slide movement in the optical axis direction. As a result, it is possible to correct the spherical aberrations generated in regard to two recording layers where the distances from the surface of the optical recording medium 42 are different from each other.

When the movable lens 35 is subjected to slide movement, light incident to the object lens 37 does not become parallel light. Thus, when the object lens 37 is subjected to the transverse shift, the coma aberration is generated.

However, in the present embodiment, in the optical path from the light source 31 to the object lens 37, a predetermined spherical aberration is generated, and in the optical path from the object lens 37 to the light concentration position on the optical recording medium 42, a reverse spherical aberration is generated.

The spherical aberrations are generated so as to erase each other in the state in which there is no transverse shift of the object lens 37. For this reason, when the object lens 37 is subjected to the transverse shift to follow the eccentricity of the recording track of the optical recording medium 42, the spherical aberrations which erased each other deviate from each other, whereby the coma aberration is generated.

By the coma aberration, it is possible to erase and correct the coma aberration, which is generated due to the fact that the light incident to the object lens 37 during transverse shift is not parallel light.

Furthermore, the spherical aberration generated in the optical path from the light source 31 to the object lens 37 may be generated by the fixed lens 34 or the movable lens 35. Additionally, a liquid crystal element or an expander lens, and a PLZT may be inserted into the optical path.

Moreover, the spherical aberration generated in the optical path from the object lens 37 to the focal point on the optical recording medium 42 can be given by regulating the WD of the object lens 37.

In this manner, in the pickup apparatus 200 according to the present embodiment, with respect to the recording medium 42 having two recording layers, the aberration of the laser light used in the recording and the reproduction can be reduced. For this reason, highly accurate recording and reproduction is possible and the margin when manufacturing can be also enlarged, so that the production is possible in a simpler, easier and low cost manner.

3. Third Embodiment

In the above-mentioned embodiments, the present invention was applied to the optical recording medium having a plurality of recording areas. However, the present invention can also be applied to an optical recording medium having one recording layer and exhibits an excellent effect. This will be described later with reference to FIG. 16.

Figure 16:
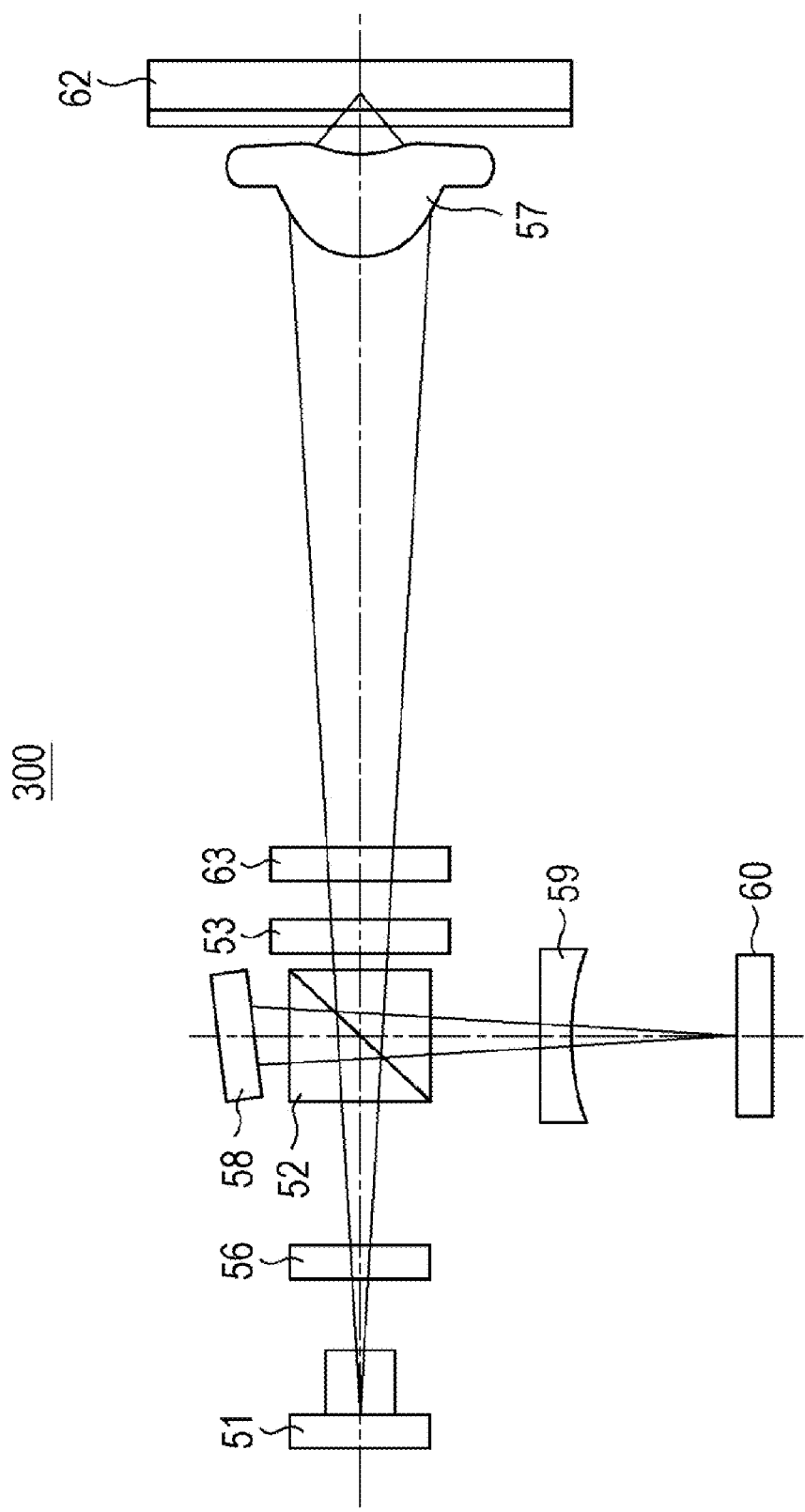
FIG. 16 is a schematic configuration diagram showing a pickup apparatus according to a third embodiment.

FIG. 16 is a schematic configuration drawing that shows a pickup apparatus 300 according to the present embodiment.

The pickup apparatus 300 according to the present embodiment can preferably use an optical disc having one recording layer.

The pickup apparatus 300 in the present embodiment includes a light source 51 which emits an illumination light onto an optical recording medium 62, and a luminous flux division element 56 which divides the light from the light source 51 into a plurality of luminous fluxes.

In addition, the pickup apparatus 300 includes a polarization beam splitter 52 which is disposed on the optical path of rays divided by the luminous flux division element 56, and a ¼ wavelength plate 53 which is disposed on the optical path of the rays which penetrated the polarization beam splitter 52.

Moreover, the pickup apparatus 300 includes an object lens 57 which concentrates the rays which penetrated the ¼ wavelength plate 53 on the optical recording medium 62, and a liquid crystal aberration correction element 63 which is disposed between the light source 51 and the object lens 57 and gives the spherical aberration in the penetrated light.

In addition, the pickup apparatus 300 includes a light concentration lens 59 that concentrates the reflected light from the optical recording medium 62, and a light sensing element 60 that receives the light concentrated by the light concentration lens 59.

In a case where, for example, the optical recording medium 62 is a normal optical disc having one recording layer such as a CD or a DVD, a red semiconductor laser having the wavelength of 650 nm is preferably used in the light source 51. Furthermore, in a case where the optical recording medium 62 is, for example, a Blu-ray Disc having one recording layer, a blue violet semiconductor laser having the wavelength of 405 nm can be used in the light source 51.

The laser light emitted from the light source 51 is divided into a plurality of rays, for example, by a luminous flux division element 56 such as a diffraction grid. By the divided rays, it is possible to form side spots, for example, used in the calculation of the tracking error signal.

The plurality of rays divided by the luminous division element 56 penetrates the polarization beam splitter 52 and the ¼ wavelength plate 53, and is incident to the liquid crystal aberration correction element 63. By the liquid crystal aberration correction element 63, the spherical aberration is generated in light from the light source 51. A liquid crystal element, for example, as shown in FIG. 14 (the first embodiment) can be used in the liquid crystal aberration correction element 63.

In addition, the light which penetrated the liquid crystal aberration correction element 63 is incident to the object lens 57 and is concentrated on the recording layer of the optical recording medium 62.

Furthermore, the light reflected by the optical recording medium 62 penetrates the object lens 57 and the ¼ wavelength plate 53 again and is incident to the polarization beam splitter 52. In the back and forth path, since the rays from the light source 51 penetrates the ¼ wavelength plate 53 twice, whereby the polarization direction is rotated by 90°, the rays are reflected by the polarization beam splitter 52.

The rays reflected by the polarization beam splitter 52 are concentrated on the light sensing element 60 by the light concentration lens 59, whereby various signals such as the RF signal, the tracking error signal or the focus error signal are acquired herein.

In this manner, in the present embodiment, the spherical aberration generated in the optical path from the light source 51 to the object lens 57 is generated by the liquid crystal aberration correction element 63.

Moreover, the spherical aberration generated from the object lens 57 to the focal position on the recording layer of the optical recording medium 62 is generated by changing the WD of the object lens 57.

In the state in which there is no transverse shift of the object lens 57, the WD of the object lens 57 is adjusted so that the spherical aberrations erase each other. Thus, when the object lens 57 is subjected to the transverse shift to follow the eccentricity of the recording track of the optical recording medium 62, there are deviations in these spherical aberrations, whereby the coma aberration is generated.

Even in the present embodiment, by the coma aberration, it is possible to erase and correct the coma aberration which is generated by the transverse shift when the rays incident to the object lens 57 is not parallel light.

If the rays incident to the object lens are parallel light, even if the object lens is subjected to the transverse shift, the coma aberration is not generated. For this reason, it was common that, in a pickup apparatus of related art for an optical recording medium having one recording layer, a collimate lens is disposed, thereby causing the collimated light to be incident to the object lens.

However, in the present invention, by the coma aberration which is generated by the deviation of the spherical aberration generated in the optical path from the light source to the object lens and the spherical aberration generated in the optical path from the object lens to the focus, the above-mentioned coma aberration can be erased.

That is, according to the present invention, even if parallel light is not incident to the object lens, the coma aberration generated by the transverse shift of the object lens can be suppressed.

Thus, as in the present embodiment, by the spherical aberration generated in the optical path from the light source 51 to the object lens 57, it is possible to suppress the occurrence of the coma aberration without providing the collimate lens.

For this reason, simple components can be used, which can reduce the cost and the size of the apparatus.

Furthermore, although an example of generating the spherical aberration by the liquid crystal was given herein, if the spherical aberration can be generated, anything can be used without being particularly defined, and if simpler and easier components are selected, the cost can be further reduced. That is, since it is not necessary for parallel light to be incident to the object lens according to the present invention, the range of design or component selection also widens, whereby design having a high degree of freedom is possible.

4. Fourth Embodiment

Figure 17:
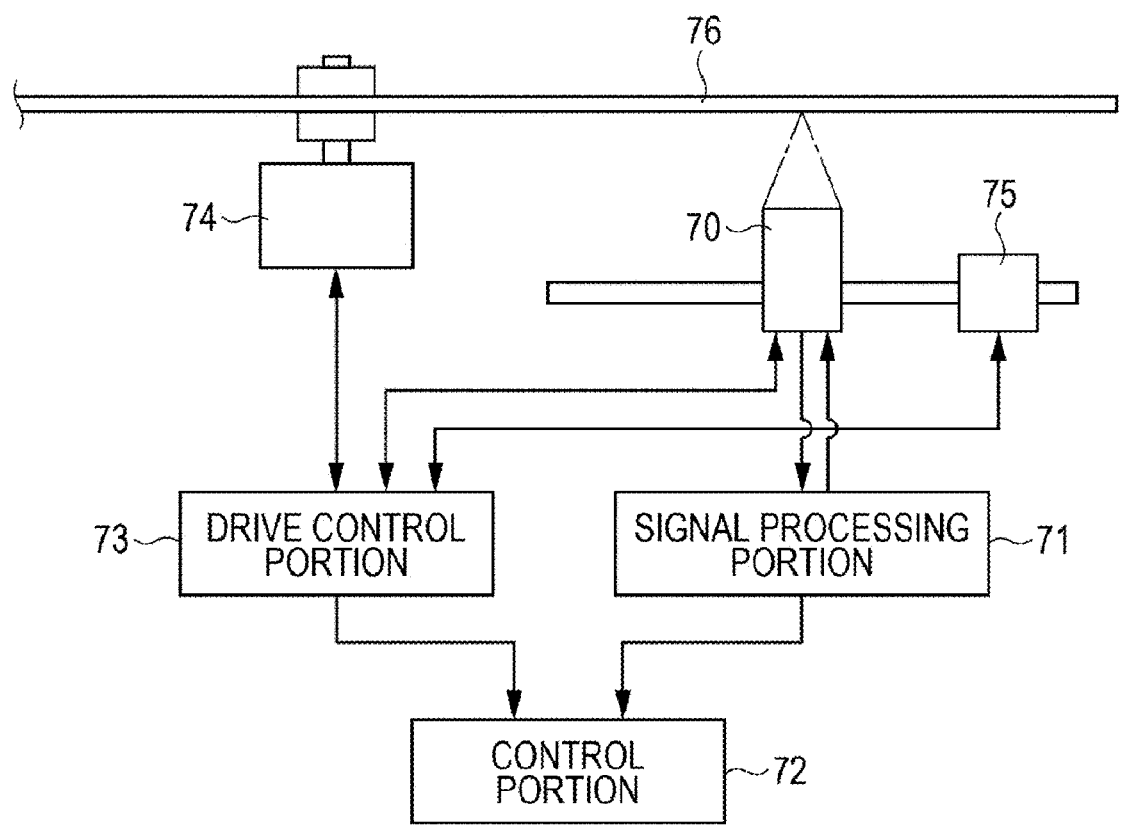
FIG. 17 is a schematic configuration diagram showing a recording and reproduction apparatus according to a fourth embodiment.

FIG. 17 is a schematic configuration diagram showing a recording and reproduction apparatus 400 according to the present embodiment.

The recording and the reproduction apparatus according to the present embodiment includes an optical pickup 70 which concentrates light on an optical recording medium 76 to perform the recording and the reproduction of a signal, and a signal processing portion 71 which performs the processing of the recording signal to the optical recording medium 76 or the reproduction signal.

Moreover, the recording and the reproduction apparatus 400 includes a rotation drive portion 74 for rotating the optical recording medium 76, a transport drive portion 75 which moves the optical pickup 70 in a diameter direction of the optical recording medium 76, and a drive control portion 73 that drives and controls the rotation drive portion 74 and the transport drive portion 75.

In addition, the recording and the reproduction apparatus 400 includes a control portion 72 which supplies the drive command to the drive control portion 73, or recording information to be recorded on the optical recording medium 76.

The control portion 72 is constituted around a CPU (Central Processing Unit) (not shown) and reads various programs such as a basic program or an information recording program, for example, from a ROM (Read Only Memory) (not shown). In addition, by developing these to a RAM (Random Access Memory) (not shown), various processing operations such as an information recording process are implemented.

For example, in the state in which the optical recording medium 76 is installed, when an information recording command, recording information and recording address information are received from an external device (not shown) or the like, the drive command and the recording address information are supplied to the drive control portion 73, and the recording information is supplied to the signal processing portion 71.

Furthermore, during reproduction, when the information reproduction command from the external device and the reproduction address information showing the address of the recording information are received, the drive command is supplied with respect to the drive control portion 73, and the reproduction processing command is supplied to the signal processing portion 71.

The drive control portion 73 drives and controls the rotation drive portion 74 such as, for example, a spindle motor according to the drive command from the control portion 72, thereby rotating the optical recording medium 76 at a predetermined velocity. Furthermore, for example, by driving and controlling the transport drive portion 75 such as a thread motor, the optical pickup 70 is caused to slide in the diameter direction of the optical recording medium 76, thereby moving the optical pickup 70 to a position corresponding to the recording address information or the recording and the reproduction position.

The signal processing portion 71 performs various signal processing operations such as a predetermined encoding processing or a modulation processing with respect to the supplied recording information, thereby creating the recording signal and supplies the optical pickup 70 with the recording signal.

Moreover, during reproduction, the servo error signal or the RF signal is calculated by a matrix circuit (not shown), and a gain adjustment and a phase compensation are performed.

In addition, based on the error signal calculated by the signal processing portion 71, the drive control portion 73 performs the focus control and the tracking control of the optical pickup 70.

Based on the control of the drive control portion 73, the optical pickup 70 adjusts the illumination position of the light beam to the track of the optical recording medium 76 shown by the recording address information, thereby recording the recording mark depending on the recording signal from the signal processing portion 71.

Furthermore, during reproduction, by performing the focus control and the tracking control based on the control of the drive control portion 73, the illumination position of the illumination light is adjusted to the track shown by the reproduction address information, thereby illustrating a predetermined light quantity of light.

In a case where the optical recording medium 76 is a multilayer recording optical disc or a micro reactor type of optical disc having a pseudo multilayer structure of a recording layer, the pickup apparatus 100 shown in the first embodiment (FIG. 1) can be used in the optical pickup 70.

Furthermore, in a case where the optical recording medium 76 is an optical disc having two recording layers, it is desirable that the pickup apparatus 200 shown in the second embodiment (FIG. 15) is used.

Moreover, in a case where the optical recording medium 76 is an optical disc having one recording layer, the pickup apparatus 300 shown in the third embodiment (FIG. 16) can be used.

Thus, in the recording and the reproduction apparatus 400 according to the present embodiment, in the optical pickup 70, the spherical aberrations are generated in each of the optical path from the light source to the object lens and the optical path from the object lens to the focus.

Furthermore, the spherical aberrations erase each other in the state in which the object lens is not subjected to the transverse shift, and when the object lens is subjected to the transverse shift, the coma aberration is generated by the deviation of the spherical aberrations.

For this reason, through the coma aberration, it is possible to erase and correct the coma aberration which is generated by the transverse shift when the rays incident to the object lens are not parallel.

Thus, in the case of using the pickup apparatus 100 and 200 according to the first and second embodiments, even if the use magnification of the object lens is changed, it is possible to concentrate light on the respective recording layers or the recording areas of the multilayer optical recording medium or the like without generating the coma aberration.

For this reason, the recording and the reproduction apparatus 400 according to the present embodiment can very accurately perform the recording and the reproduction.

Furthermore, in a case where the pickup apparatus 300 according to the third embodiment is used in the optical pickup 70, since the optical pickup 70 does not use the collimator lens, it is possible to provide the recording and the reproduction apparatus which is smaller and has a low cost.

Hereinabove, the embodiments of the pickup apparatus, the recording and the reproduction apparatus, and the recording and the reproduction method according to the present invention have been described. It is needless to say that the present invention includes various embodiments to be considered within the scope which does not depart from the gist of the present invention described in the claims without being limited to the above-mentioned embodiments.

The present application contains subject matter related to that disclosed in Japanese Priority Patent Application JP 2009-276619 filed in the Japan Patent Office on Dec. 4, 2009, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is

1. A pickup apparatus comprising:
    a light source;
    a light separator, which is disposed on an optical path of light emitted from the light source, to separate light emitted from the light source and reflected light from an optical recording medium;
    an object lens to concentrate the light which penetrated the light separator on the optical recording medium;
    a movable lens, which is disposed between the light source and the light separator or between the light separator and the object lens, to change an object point position of the object lens by being moved in an optical axis direction;
    a light sensing element to receive the reflected light from the optical recording medium separated by the light separator,
    wherein a coma aberration generated by a transverse shift of the object lens is corrected by a coma aberration which is generated by a deviation of a spherical aberration generated in an optical path from the light source to the object lens and a spherical aberration generated in an optical path from the object lens to a light concentration position on the optical recording medium which are due to the transverse shift;
    a second light source;
    a luminous flux division element to divide light from the second light source into a plurality of rays;
    a second movable lens that is disposed on an optical path of the rays divided into the plurality of rays and is movable in an optical axis direction;
    a ray synthesizer to guide the light which penetrated the second movable lens to the object lens to concentrate the light to a land/groove of the optical recording medium;
    a second light separator, disposed between the luminous flux division element and the second movable lens, to separate the light from the second light source reflected by the optical recording medium; and
    a second light sensing element to receive the light separated by the second light separator.

2. The pickup apparatus according to claim 1, wherein the spherical aberration generated in the optical path from the object lens to the light concentration position on the optical recording medium is generated by changing a distance from the object lens to the optical recording medium surface.

3. The pickup apparatus according to claim 1, wherein the spherical aberration generated in the optical path from the light source to the object lens and the spherical aberration generated in the optical path from the object lens to the light concentration position on the optical recording medium erase each other when there is no transverse shift of the object lens.

4. The pickup apparatus according to claim 1, wherein the spherical aberration generated in the optical path from the light source to the object lens is generated by the movable lens.

5. The pickup apparatus according to claim 1, wherein the spherical aberration generated in the optical path from the light source to the object lens is generated by a liquid crystal element.

6. The pickup apparatus according to claim 1, wherein the spherical aberration generated in the optical path from the light source to the object lens is generated by a PLZT.

* * * * *